United States Patent

[11] 3,581,847

| [72] | Inventors | Tatsumi Torii<br>Kariya-shi;<br>Masakazu Ishikawa, Toyota-shi, both of,<br>Japan |
|---|---|---|
| [21] | Appl. No. | 724,815 |
| [22] | Filed | Apr. 29, 1968 |
| [45] | Patented | June 1, 1971 |
| [73] | Assignees | Aisin Seiki Company Limited<br>Asahi-machi, Kariya-shi, Aichi-ken, ;<br>Toyota Jidosha Kogyo Kabushiki Kaisha<br>Toyota-machi, Toyota-shi, Aichi-ken,<br>Japan |
| [32] | Priority | Apr. 30, 1967 |
| [33] | | Japan |
| [31] | | 42/36508 |

[54] AUTOMATIC ADJUSTING DEVICES FOR SHOE DRUM BRAKES
9 Claims, 5 Drawing Figs.

[52] U.S. Cl............................................................ 188/79.5,
188/106, 188/196
[51] Int. Cl............................................................F16d 51/52,
F16d 65/56

[50] Field of Search....................................... 188/79.5(P,K),
(GE), (GT), 196 (RR), 106 (F)

[56] References Cited
UNITED STATES PATENTS
| 2,224,197 | 12/1940 | Schlueter | 188/79.5(GE) |
|---|---|---|---|
| 2,389,618 | 11/1945 | Goepfrich | 188/79.5(GE) |
| 3,216,534 | 11/1965 | Chouings et al. | 188/79.5(GE) |
| 3,323,618 | 6/1967 | Riddy | 188/79.5(GE) |

FOREIGN PATENTS
| 1,022,467 | 3/1966 | Great Britain | 188/79.5(GE) |
|---|---|---|---|

*Primary Examiner*—Duane A. Reger
*Attorney*—Sughrue, Rothwell, Mion, Zinn and Macpeak ABSTRACT: An automatic adjuster for a shoe drum brake which is provided with a hydraulic shoe expander, having a hydraulic piston mechanically connected with one of said shoes and a movable cylinder connected through a variable length transmission means to the remaining one of said shoes, the length of said transmission means being adjustable through a mechanical adder adapted for adding the working movements of said cylinder and said piston.

PATENTED JUN 1 1971 3,581,847
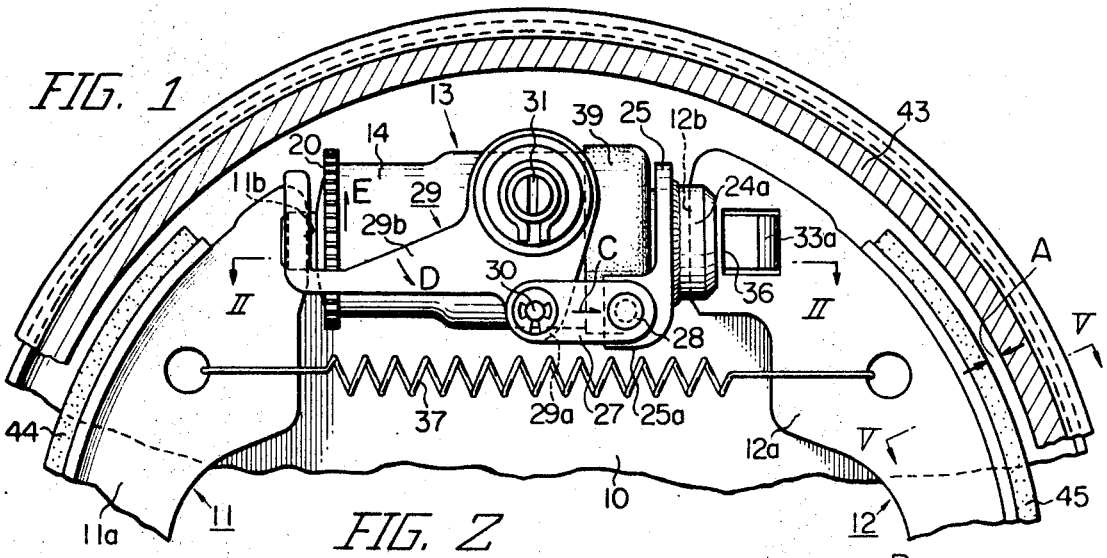

AUTOMATIC ADJUSTING DEVICES FOR SHOE DRUM BRAKES

This invention relates generally to automatic adjusting devices for shoe drum brakes. More specifically, it relates to an automatic adjuster for vehicle brakes of the kind in which friction members such as shoes or friction pads are applied to a rotatable member such as a drum or disc by actuating means.

As a representative type of the automatic adjuster of the above kind may be mentioned of that disclosed in British Patent 996,857 published June 30, 1965. In this proposed adjuster, a friction member is applied to the rotating member by said actuating means incorporating a transmission member of adjustable length which, when wear of the friction surfaces has taken place is adjusted on application or release of the brake by a resilient pawl rigidly secured at one end to the actuating means or to a part of the brake, and engaging at its other end with ratchet teeth on a part of the transmission member. In this adjuster, when the angular movement of a conventional bellcrank lever mechanically connected with the parking or emergency braking hand lever, in the application of the brake therefrom exceeds a predetermined value owing to wear of the friction linings on the shoes, the free end of said pawl rides over one or more of the ratchet teeth, and on the return movement of the lever the pawl moves the ratchet wheel formed into a nut member, being kept in threaded engagement with a threaded stem constituting the adjustable length transmission member, angularly in a direction to increase the effective length thereof.

According to our experience, however, aqueous drops are liable to accumulate in the hinge joints in the adjuster, especially in cold winter night. Therefore, when the parking handbrake has been applied and the adjuster is subjected to ice freezing in the above sense, the brake mechanism may frequently be not ready for practical use, especially when it is desired to start the vehicle in cold morning.

It is the object of the present invention is to provide an automatic adjuster which operates exclusively in connection with the operation of a hydraulic piston and cylinder assembly which is mounted as conventionally between the two opposing operating ends of the brakeshoes for actuating the same.

Other proposal is disclosed in U.S. Pat. No. 3,216,534, granted Nov. 9, 1965 to Leslic C. Chouings et al. This automatic adjuster is adapted for operating manually in the above-mentioned sense, and hydraulically by actuation of the service brake.

In this prior adjuster, however, the sprocket wheel is caused to slide in the longitudinal direction of the adjusting pawl when the wheel is rotated by the latter which invites a highly increased frictional force in the driving engagement of the pawl with the ratchet wheel, resulting in an uncertainty in the operation of the adjuster.

An object of the present invention is to provide an automatic adjuster of the kind above referred to, which is capable of operating with a slightest possible engaging resistance acting between the both for increasing the operating accuracy of the adjuster.

Still another object is to provide an automatic adjuster of the above kind, which assures an effective sealing of the hydraulic chamber os said hydraulic piston and cylinder assembly.

A still another object of the invention is to provide an automatic adjuster of the above kind, the sprocket wheel of which can be manually rotated from outside, for the convenience of dismantling the brakeshoes from the wornout recesses formed on the brakedrum on account of long extended use of the brake.

A further object is to provide an automatic adjuster in which the adjusting pawl normally kept in engagement with teeth on the sprocket wheel can be disengaged therefrom as will be required for dismantling the ratchet wheel from the adjuster.

These and further objects, features and advantages of the invention will become more clear when read the following detailed description of the invention by reference to the accompanying drawings illustrative of a preferred embodiment and thus in no limiting sense of the invention.

In the drawings:

FIG. 1 is a part of cross-sectional view of an internal expanding shoe drum brake fitted with the automatic adjuster according to this invention, the section being taken on a plane perpendicular to the longitudinal axis of the brakedrum at a intermediate point thereof between its both extremities.

FIG. 2 is a partial sectional view of the hydraulic piston and cylinder assembly as the actuator for the brake shows, the section being taken along the section line II-II shown in FIG. 2.

FIG. 3 is a schematic front view of the sprocket wheel and threaded stem assembly employed in the mechanism shown in FIGS. 1 and 2, wherein, however, the adjusting pawl is also shown in two different operating positions kept in engagement with teeth on the sprocket, one being in full section and the other being shown in phantom.

FIG. 4 is a schematic side view of said sprocket-pawl assembly, the backplate only being shown in its section, illustrating the possibility for manual disengagement of said pawl from the sprocket and for manual turning of the latter.

FIG. 5 is a partial and sectional view taken along the section line V-V shown in FIG. 5.

Referring now to the drawings, a stationary backplate 10 has mounted on it a pair of opposing brakeshoes 11 and 12 between adjacent ends of which is provided a hydraulic shoe-actuator, generally shown at 13, whilst between the other pair of adjacent ends there is provided a shoe mount, not shown, relative to which the shoes can rock in the plane of the backplate 10. The shoe-actuator 13 comprises a hydraulic cylinder 14 formed with two longitudinally extending and outwardly directing blind bores 15 and 16 separated from each other by a separating wall 17 integral with the body of the cylinder 14. The former bore 15 serves as hydraulic cylinder chamber which receives slidably a piston 18, while the latter bore 16 receives rotatably a cylindrical nut 19 which is formed integrally at its outer end with a toothed wheel 20 having a number of teeth 20a on its peripheral surface. The nut 19 has female threads 19a which are kept in engagement with male threads 21a on a threaded stem 21. This stem is formed on its outer end with a recess 22 which receives under pressure the inside edge at 11b of the upper end part of web 11a of the brakeshoe 11.

Hydraulic piston 18 is formed at its outer portion with a blind longitudinal bore 23 receiving a stepped headpiece 24 which has an integral head 24a. Between the outer end of the piston 18 and the headpiece 24, there is a L-shaped bracket 25 which is kept in position by welding it to said head 24a. The stem 24a passes snugly through the bracket 25. The head 24a is formed with a recess 26 which receives under resilient pressure of the inside edge at 12b of the shoe web 12a.

A connecting link 27 is pivotally connected at its one end at 28 with the lower end 25a of said bracket 25 and at its opposite end with the short arm 29a of a bellcrank lever 29 by a pivot pin 30, which bellcrank lever being kept in engagement at 29b with teeth on the sprocket 20 and adapted for acting as the adjusting pawl for adjustingly turning the sprocket. The bellcrank lever 29 is pivotally mounted on the wall of said hydraulic cylinder 14 by means of a pivot pin 31.

As seen from FIG. 2, the upper part of the hydraulic cylinder 14 is guided by a slot 32, the width amounting to say 40 millimeters, formed in the backplate 10, for allowing the cylinder to-and-fro so as to act as the reaction member to the hydraulic piston 18.

A further bellcrank lever 33 is pivotably mounted at 34 on the projection 14a of the hydraulic cylinder, the eye end 33a of the longer lever arm being mechanically connected to a manual parking lever, not shown. The shorter arm of the bellcrank is guided with plays through a further slot 35 formed again in the backplate 10 and having a small width, say 6 millimeters. These slots 32 and 35 are kept in communication with each other, as shown. The tip end of the shorter lever arm 33b is guided by a slot 36 which is formed through the upper part of web 12a of the shoe 12.

The shoes 11 and 12 are kept normally in its retracted position shown, under the influence of a tension spring 37 bridged between the upper end parts of webs of the shoes 11 and 12.

For guarding the sliding parts of the cylinder and backplate from possible invasion of foreign particles from outside, there is provided a resilient protecting hood 38 mounted on the both members. The longer arm of the emergency brake lever 33 passes snugly through an opening 38a formed in the hood. Sealing means 39 is also provided between the piston and cylinder for protecting the sliding surfaces thereof from dirting.

As seen from FIG. 2, the left-hand end of the piston 18 is formed integrally with a reduced and headed projection 18a on which is mounted a resilient sealing ring 41.

The working chamber at 42 in the hydraulic cylinder 14 is fluidically connected through a duct 40 to a conventional master brake cylinder, for receiving pressure oil therefrom and discharging excess oil thereto.

The operation of the above-mentioned automatic adjuster is as follows.

When the brake is not applied, the parts concerned are positioned as shown. But, the working chamber 42 of the hydraulic cylinder is filled with oil from the master cylinder.

When the operator actuates a conventional brake pedal by applying his foot pressure, increased pressure oil is delivered from the master cylinder via conduit 40 to the working chamber 42 and thus the piston 18 will be advanced towards right in FIG. 2. The movable cylinder 14 will slide along the backplate 10 by being guided by slot 32 in the opposite direction under the influence of the hydraulic reaction. Brakeshoes 11 and 12 are therefore urged towards the brakedrum until the brake linings at 44 and 45 on the shoes are brought into pressure contact with the inner wall surface of the brakedrum 43. Thus, the regular gap shown at "A" which amounts normally to 0.5 millimeter is naturally reduced to nil, for effecting the braking action.

When wear of the braking surfaces is considerable and exceed beyond a predetermined valve of said "A," the working stroke of piston 18 will become correspondingly large and the corresponding sliding stroke of the cylinder 14 will be increased correspondingly. Since the bracket 25 is fixedly mounted on the headpiece 24, it is accompanied in the working stroke of the piston 18 by the latter and the practical working stroke of the piston and thus that of the shoe 12 against the action of tension spring 37 is sensed in the form of a pull by the connecting link 27, as hinted by an arrow "C" shown in FIG. 1. This pulling operation is imparted to the shorter arm 29a of the adjusting bellcrank lever 29 which is caused to turn in the counterclockwise direction about its pivot 31 on the hydraulic cylinder 14. The first rotational movement of the lever 29 corresponds practically to the working stroke of the shoe 12. As was described, the cylinder 14 will slide in the opposite direction under the influence of hydraulic reaction and again against the action of tension spring 37. This will cause the lever 29 to swivel around its pivot 31 in the same counterclockwise direction. This second rotational movement of lever 29 is carried out naturally simultaneously with the said first rotational movement and in the same turning direction, as hinted by an arrow D shown in FIG. 1. Therefore, when the hydraulic brake actuating mechanism, generally shown at 13, is actuated and its piston and cylinder are caused to move hydraulically in opposite directions from each other, their combined or overall effective stroke is transformed into the combined first and second rotational movement of the lever 29. It will be thus seen that the related members 25, 27, 28, 29, 30 and 31 constitute together a kind of adder to add the effective strokes of the piston and cylinder to each other, and thus those of both shoes 11 and 12.

When wear of the shoe linings 44 and 45 and that of the cooperating drum surface becomes considerable so that the brake gap for each of the brake linings should increase beyond the prescribed value "A" plus 0.013 millimeter, for instance, the longer lever arm 29b will ride over one tooth and brought into engagement with the next neighboring tooth. This movement of the resilient pawl 29b is shown in FIG. 3. The shifted position of the pawl is shown at 2940 in imaginary lines.

When the hydraulic pressure in the cylinder chamber 42 is released, the return spring 37 will become effective for returning the brakeshoes from its working position to its rest position shown. Therefore, motion is transmitted inversely from the shoes to the hydraulic piston and cylinder. By this return movement, the bellcrank lever 29 will be rotated in the clockwise direction in FIG. 1 and thus the wheel 20 is driven one tooth in the direction of the arrow E, shown in FIGS. 1 and 3, respectively so as to keep the regular brake gap "A."

As an example, the ratchet wheel 20 may have a diametral dimension of 36 millimeters and 24 teeth on its periphery. The threads on the adjusting stem 21 may have, in this case, a pitch of 1.25 millimeters.

When the sprocket wheel 20 is turned in the direction E by the said returning movement of bellcrank lever 29, the threaded stem 21 will advance a corresponding linear amount in the left-hand direction in FIG. 2, so as to recover the regular brake gap "A." The engagement of the pawl 29b with teeth on the sprocket wheel 20 is assured by the inherent resiliency of the pawl formed the longer lever arm 29b.

When the manual parking brake lever is pulled so as to swivel the bellcrank lever 33 about its pivot 34 in the counterclockwise direction shown by the arrow B in FIG. 2, the brakeshoe 12 is urged to move in the right-hand direction in the same FIG. for applying the shoe on the inside wall surface of brakedrum 43, while the opposite shoe 11 is equally advanced towards the brakedrum by the sliding movement of the cylinder 14 in the opposite direction along the backplate 10 on account of the mechanical reactive force acted upon the cylinder. Therefore, the brake clearance adjusting action will not take place in any way, because there is no relative movement of the hydraulic piston 18 relative its cylinder 14.

The wheel 20 will be naturally turned two or more teeth when the brake gap is increased considerably by heavy wear.

It will be therefore clearly understood that, in the automatic adjuster according to this invention, when the brake clearance is increased beyond a certain predetermined value it is automatically recovered to the prescribed value by the regular operation of the hydraulic shoe-expanding mechanism 13 fitted with a specifically designed motion-adder device, while in the operation of the manual parking brake there is no clearance adjusting operation to take place, thereby assuring a safety operation thereof even in a cold weather by avoiding freezing stick of motion transmitting mechanism embodied in the automatic adjuster.

Now referring to FIG. 4, a tool such as a screwdriver 46 is inserted through an opening 47 formed through the backplate 10 until the tip end of the tool is brought into contact with the resilient pawl 29 when it is desired to disengage manually the pawl from the teeth of the sprocket wheel 20. By exerting a slight manual pressure upon the driver 46 in its longitudinal direction against the inherent resiliency possessed by the pawl 29, the latter can be simply and easily disengaged for adjusting or the like purpose.

When a second tool such as screwdriver 48 is inserted under these conditions through the same opening 48 until its tip end engage with one of the tooth spaces on the periphery of the wheel 20 as shown and the latter may be rotated in the reverse direction shown by the arrow G by applying a turning force in the direction of arrow F upon the gripped end of the tool for adjusting the brake gap.

By the reverse manual movement of the sprocket wheel 20, the brake gap may be increased as desired, thereby giving a possibility for easy dismantling of the brakeshoes, even when the braking surface of the drum has been considerably worn on account of severe and long extended use of the brake until deep steps have been formed on the drum wall surface which formation prevents the brakeshoes from being taken out of the interior drum space. The thus increased brake gap is shown at A in FIG. 5.

In contrast to the conventional design, the sprocket wheel is mounted on the cylinder end which is opposite to another end thereof from which the piston emerges, effective seal can be easily applied to the hydraulic piston.

As seen from the foregoing, there is practically no relative longitudinal movement of the pawl 29 relative to the sprocket wheel 20 during the brake gap adjusting operation of the mechanism 13, the adjusting operation is encountered with none of heavy sliding resistance when exerting the required turning effort onto the wheel 20.

It will be obvious to those skilled in the art that many modifications may be made within the scope of the present invention without departing from the spirit thereof, and the invention includes all such modifications.

We claim:

1. In an automatic slack adjusting device for an automotive brake of the expansion type comprising a rotating drum and friction shoe means adapted for cooperation therewith, wherein said shoe means are expandingly applied against said drum in such a manner as to obtain action and reaction therebetween when said friction shoe means is actuated by two kinds of actuating means adapted for functioning independently of each other, said adjusting device comprising a slack actuating adjusting means being operable in both a parking and a service brake mode and having no functional interference therebetween, wherein the improvement comprises such that one of said two actuating means is provided with a slack adjusting means and a fluid actuator means having an operating piston and cylinder assembly, said piston being located in said cylinder separately from and in the end of said cylinder which is opposite said adjusting means, said slack adjusting means being adjusted automatically by movement of said operating piston exclusively in the application of the brake when the wear of the brakeshoe exceeds a predetermined value.

2. An automatic slack adjusting device as set forth in claim 1, wherein said slack adjusting means comprises a cylindrical nut integrally formed with a toothed wheel, and a threaded stem in engagement with said cylindrical nut and one of said friction shoe means, said toothed wheel being mechanically connected with said operating piston of said fluid actuator means.

3. An automatic slack adjusting device as set forth in claim 2, wherein said toothed wheel is mechanically connected with said operating piston by a connecting means comprising two connecting members, one of which is connected at its one end with said operating piston, the opposite end of said one of said connecting members being pivotably connected with another of said connecting members at one end thereof, said other connecting member being made of resilient material, pivotably mounted on said fluid actuator means, and kept in engagement with said toothed wheel.

4. An automatic slack adjusting device as set forth in claim 3, wherein said one of said connecting members comprises an L-shaped bracket provided with a circular ring portion positioned between said one of friction shoe means and said operational piston and adapted to said piston by means of a stepped headpiece.

5. An automatic slack adjusting device as set forth in claim 4, wherein said threaded stem of the slack adjusting means is formed on its one end with a recess which is mechanically connected with one end part of said one of friction shoe means, and said stepped headpiece is formed with a recess mechanically connected with another of said friction shoe means, whereby the threaded stem and the stepped headpiece cannot be rotated when the slack adjusting device is actuated.

6. An automatic slack adjusting device as set forth in claim 1, wherein one of said actuating means is slidable relative to a backplate, and another of said actuating means is pivotably mounted on the first actuating means and comprises a bellcrank lever guided through a slot formed in the backplate.

7. An automatic slack adjusting device comprising a fluid actuator means including a hydraulic operational piston, a slack adjusting means located opposite to the fluid actuator means and including a cylindrical nut, a threaded stem in engagement therewith, an L-shaped connecting means, one end of which is mechanically connected with said piston, a resilient bellcrank lever pivotably mounted on said fluid actuator means and operatively connected at its one end with another end of said L-shaped connecting means, and a toothed wheel mechanically connected with said bellcrank lever.

8. An automatic slack adjusting device as set forth in claim 7, wherein said toothed wheel is turned when movement of the operational piston exceeds a predetermined value in the application of the brake, with said tooth wheel being turned only when the brake is released.

9. An automatic slack adjusting device as set forth in claim 7, wherein said toothed wheel is turned when movement of the operational piston exceeds a predetermined value in the application of the brake, with said tooth wheel being turned only when the brake is released.